United States Patent
Taylor et al.

(10) Patent No.: US 11,938,440 B2
(45) Date of Patent: Mar. 26, 2024

(54) SMART FOG NET

(71) Applicant: International Business Machines Corporation, Armonk, NY (US)

(72) Inventors: Christine L Taylor, Fishkill, NY (US); Michael George Jutt, Fishkill, NY (US); Gatto Gobehi, Poughkeepsie, NY (US); Marci Devorah Formato, Clintondale, NY (US); Arkadiy O. Tsfasman, Wappingers Falls, NY (US)

(73) Assignee: International Business Machines Corporation, Armonk, NY (US)

(*) Notice: Subject to any disclaimer, the term of this patent is extended or adjusted under 35 U.S.C. 154(b) by 636 days.

(21) Appl. No.: 17/122,436

(22) Filed: Dec. 15, 2020

(65) Prior Publication Data

US 2022/0184523 A1    Jun. 16, 2022

(51) Int. Cl.
   *B01D 5/00*    (2006.01)
   *B01D 53/26*   (2006.01)
   *E03B 3/28*    (2006.01)
   *G05B 15/02*   (2006.01)

(52) U.S. Cl.
   CPC ......... *B01D 5/0051* (2013.01); *B01D 53/261* (2013.01); *B01D 53/265* (2013.01); *E03B 3/28* (2013.01); *G05B 15/02* (2013.01)

(58) Field of Classification Search
   CPC .. B01D 5/0051; B01D 53/261; B01D 53/265; B01D 5/0003; E03B 3/28; G05B 15/02
   USPC ...................................................... 700/282
   See application file for complete search history.

(56) References Cited

U.S. PATENT DOCUMENTS

| | | |
|---|---|---|
| 7,507,277 B2 | 3/2009 | Lawrence |
| 2008/0274359 A1 | 11/2008 | Lawrence |
| 2019/0030475 A1* | 1/2019 | Witchey ................. B64D 47/08 |

FOREIGN PATENT DOCUMENTS

| | | |
|---|---|---|
| CN | 105369856 A | 3/2016 |
| CN | 106283389 B | 1/2017 |
| CN | 107034950 A | 8/2017 |
| CN | 206706898 U | 12/2017 |
| CN | 109440866 A | 3/2019 |
| CN | 110056043 A | 7/2019 |
| CN | 110130439 A | 8/2019 |
| CN | 110272682 A | 9/2019 |
| CN | 209429196 U | 9/2019 |
| CN | 110552397 A | 12/2019 |

(Continued)

OTHER PUBLICATIONS

Anonymous. "Turning Lives Around with Water." Accessed Aug. 24, 20. 9 pages. Published by IBM. https://www.ibm.com/thought-leadership/water/.

(Continued)

*Primary Examiner* — Michael J Brown

(74) *Attorney, Agent, or Firm* — Heather Johnston

(57) ABSTRACT

A system for collecting water may include a base and a first arm connected to the base. The first arm may have a first base portion connected to the base and a first extension portion opposite the first base portion. The system may further include a grid extended between the base and the first extension portion. The grid may include a set of hydrophilic fibers extending substantially parallel to the base and a set of hydrophobic fibers intersecting with the hydrophilic fibers.

19 Claims, 10 Drawing Sheets

(56) References Cited

FOREIGN PATENT DOCUMENTS

KR         101059738 B1    6/2011
KR     20110064807 A    6/2011

OTHER PUBLICATIONS

Chen, A., "Scientists are harvesting water by building fog harps and zapping the air." Published Jun. 8, 2018. Accessed Aug. 18, 2020. 6 pages. Published by the Verge. https://www.theverge.com/2018/6/8/17441496/fog-harvesting-water-scarcity-environment-crisis.
Jeung, T., "How Fog Harvesting Technology Provides Sustainable Clean Water for Villages." Published Nov. 24, 2018. Accessed Aug. 18, 2020. 5 pages. Published by Inverse. https://www.inverse.com/article/51123-cloudfisher-harvests-water-from-fog.
Mell, et al., "The NIST Definition of Cloud Computing," Recommendations of the National Institute of Standards and Technology, U.S. Department of Commerce, Special Publication 800-145, Sep. 2011, 7 pgs.

\* cited by examiner

400

SMART FOG NET

BACKGROUND

The present disclosure relates generally to the field of materials science, and more specifically to water collection. Water scarcity may threaten the life and livelihood of people around the world. Certain climates and areas with infrastructure damaged by natural disaster may be particularly prone to water scarcity. Water collection may be used to benefit various people and regions, particularly people and regions impacted by water scarcity.

SUMMARY

Embodiments of the present disclosure include a system, method, and computer program product for water collection.

In embodiments, a system for collecting water may include a base and a first arm connected to the base. The first arm may have a first base portion connected to the base and a first extension portion opposite the first base portion. The system may further include a grid extended between the base and the first extension portion. The grid may include a set of hydrophilic fibers extending substantially parallel to the base and a set of hydrophobic fibers intersecting with the hydrophilic fibers.

In embodiments, a method and computer program product may include a processor receiving one or more metrics from one or more respective sensors. The processor may analyze said one or more metrics. The processor may determine whether to deploy a first structure. The processor may identify a position of said first structure.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
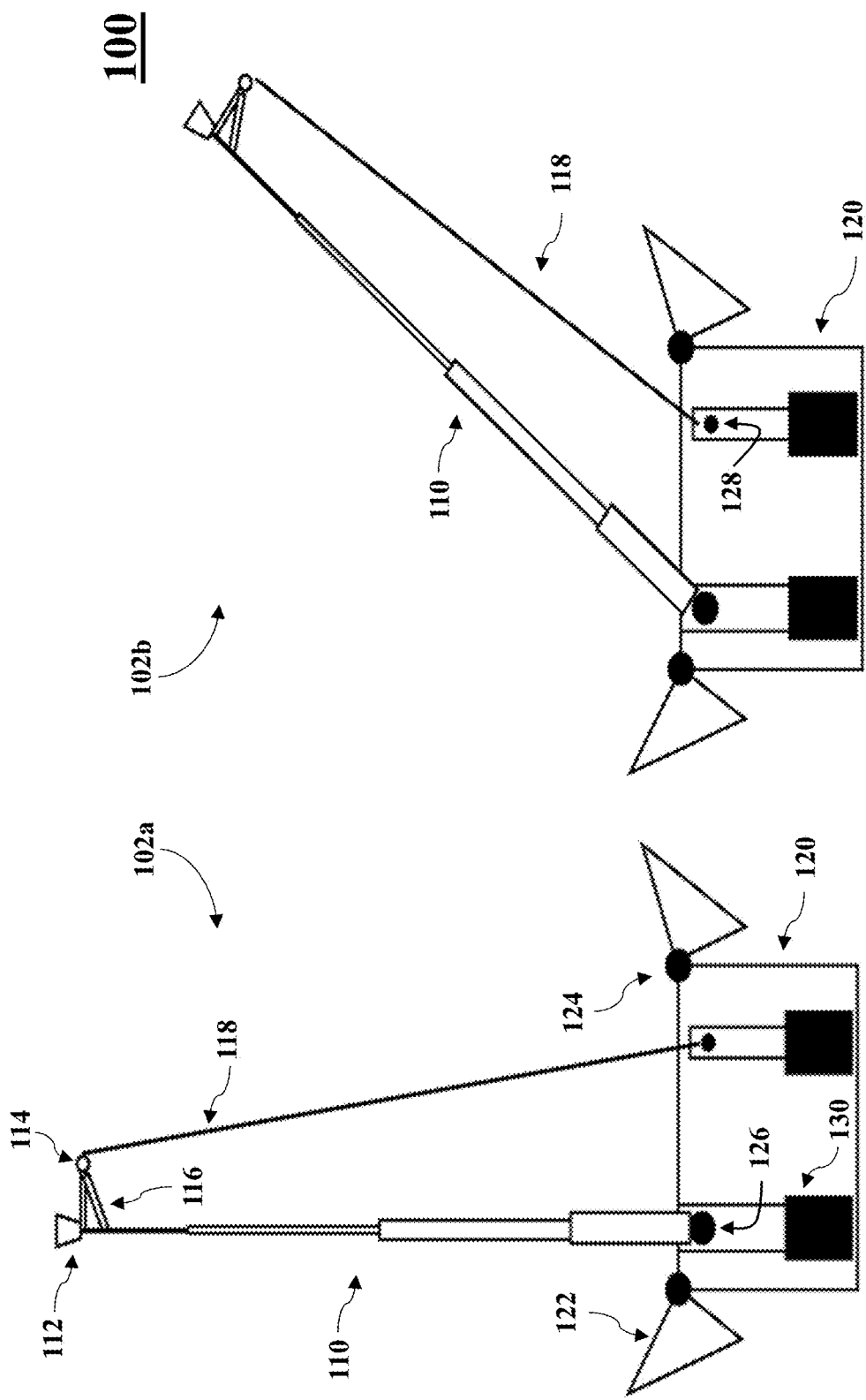
FIG. 1 illustrates a diagram of a water recovery system according to embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of materials science, and more specifically to water collection. It will be readily understood that the instant components, as generally described and illustrated in the figures herein, may be arranged and designed in a wide variety of different configurations. Thus, the following detailed description of the embodiments of at least one of a method, apparatus, non-transitory computer readable medium, and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language throughout this specification refers to the fact that a particular feature, structure, or characteristic described in connection with the embodiment may be included in at least one embodiment. Thus, appearances of the phrases "example embodiments," "in some embodiments," "in other embodiments," or other similar language throughout this specification do not necessarily all refer to the same group of embodiments, and the described features, structures, or characteristics may be combined or removed in any suitable manner in one or more embodiments. Further, in the diagrams, any connection between elements can permit one-way and/or two-way communication even if the depicted connection is a one-way or a two-way arrow. Also, any device depicted in the drawings can be a different device. For example, if a mobile device is shown sending information, a wired device can also be used to send the information.

Certain climates and areas with infrastructure damaged by natural disaster may be prone to water scarcity. Water collection may help mitigate water scarcity.

Accordingly, the present disclosure includes a method, system, and computer program product for water collection. In some embodiments of the present disclosure, a system for collecting water includes a water capture portion and a reservoir. The capture portion may include one or more arms extending from the reservoir and a grid extended substantially taut by the arms. The grid may be constructed of hydrophilic fibers extending substantially perpendicular to the force of gravity and hydrophobic fibers extending substantially parallel to the force of gravity.

FIG. 1 illustrates a diagram of a water recovery system 100 according to embodiments of the present disclosure. The water reclamation system 100 may be adjusted to various positions. The water recovery system 100 is shown in a first position 102a and a second position 102b. The first position 102a is an upright position; the upright position may also be referred to as a standard position. The second position 102b is a tilted position; the tilted position may also be referred to as a rain catch position. The water reclamation system 100 may be utilized in an upright position or a tilted position.

The first position 102a and second position 102b shown are examples of positions in which the water recovery system 100 may be used. One skilled in the art will recognize that numerous other positions may be used, as befits the circumstances of the geography and ambient conditions, in accordance with the present disclosure.

The system 100 includes a telescopic pole 110 which may be referred to as an arm or a telescopic arm. The pole 110 is connected to a base 120 via mounting brackets and mechanical housing 130. The telescopic pole 110 is shown extended on one or more actuators housed within a pole actuator assembly 126.

The system 100 also includes a guide wire 118 extended on one or more actuators housed within a guide wire actuator assembly 128. The guide wire 118 may guide a tarp 114. The tarp 114 is shown in a storage position (e.g., pre-deployment) and as such is rolled up. A bracket 116 holds the tarp 114. The guide wire 118 may guide the tarp 114 during movement (e.g., during deployment and into a storage position), and the guide wire 118 may provide stability for the tarp 114 while in use.

The actuator assemblies 126 and 128 and pole mounting brackets 130 are shown housed within a base 120. The base 120 may be a reservoir 120 for collected water. The base 120 may also be a housing or container for the system. The base 120 may have one or more cover portions 122 connected to the base 120 by a hinge 124. The cover portion 122 may be referred to as a top 122 to the base 120 or a system container lid 122. The base 120 and the cover 122 may fully enclose the other components of the system 100 in a closed position. The closed position may be useful for, among other things, travel or protecting the system 100 from harsh conditions which may expedite depreciation of the system 100.

The system 100 may further include a smart component 112. The smart component 112 may be, for example, a sensor, a solar array, or some combination thereof. A solar array 112 may collect energy to power the movement of the system 100 such that the system 100 may operate independent of another power source. Alternatives to a solar array 112 include, for example, a power outlet, conventional batteries, rechargeable batteries, fuel cells, weight and gear power generation, a cuckoo system, a turnkey, another power collection system with energy converter and storage components, or manual operation.

The sensor 112 may gather data about ambient conditions to adjust the system 100. For example, the sensor 112 may detect that the weather has changed from overcast to raining, and the sensor 112 could direct the system 100 to change from an upright position (e.g., 102a) into a rain catch position (e.g., 102b) to better capture the water. In another situation, the sensor 112 may detect a change in the wind velocity such that the wind exceeds a safety threshold for use of the system 100; the sensor 112 may signal the system 100 to change from an open position to a closed position to protect the system.

In some embodiments of the present disclosure, the system may have a closed position. In some embodiments, the first arm and the grid may transition from the closed position to the open position if a deployment threshold value is reached. In some embodiments, the first arm and the grid may transition from an open position to a closed position if a storage threshold value is reached. In the closed position, the first arm and the grid may be substantially contained within the base portion.

Figure 2:
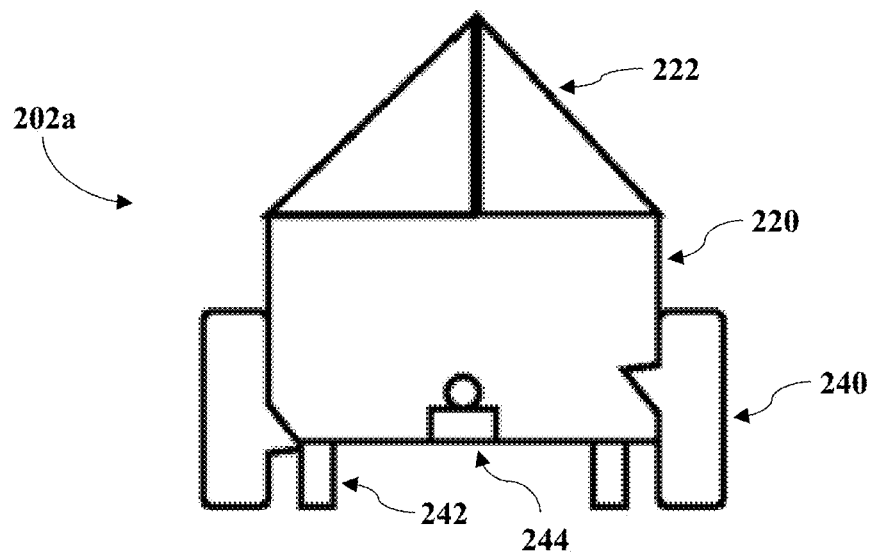
FIG. 2 depicts a diagram of a water recovery system in accordance with embodiments of the present disclosure.
Figure 2:
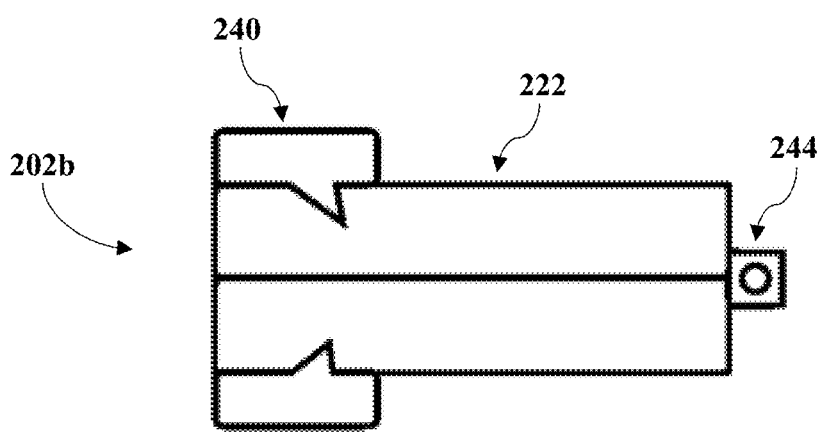

FIG. 2 depicts a diagram of a water recovery system 200 in accordance with embodiments of the present disclosure. The water reclamation system 200 is shown in a closed position wherein the system 200 is self-enclosed. The water recovery system is shown from a front perspective 202a and a top perspective 202b.

The water reclamation system 200 includes a base 220 which houses other components of the system 200. The base 220 may also be a water collection area or reservoir. The water recovery system 200 includes a top 222 of the base 220 which may also be referred to as a cover 222 of the system container 220. In embodiments wherein the water reclamation system 200 is deployed from a side of the base 220, the cover 222 may open from or at the side of the base 220.

The water recovery system 200 may be constructed to allow for ease of transport. The system 200 may include one or more wheels 240 attached to the base 220. The water reclamation system 200 may further include one or more posts 242 or additional wheels 242. The system 200 may further include a towing hitch 244 or other mechanism 244 for connecting the system 200 to a movement means. The towing hitch 244 may, for example, connect the water recovery system 200 to a vehicle to be transported like or as a trailer. Another mechanism 244 for connecting the system 200 to a movement means could be, for example, a space for connecting a rope such that the water reclamation system 200 may be pulled by an animal or a person.

Figure 3:
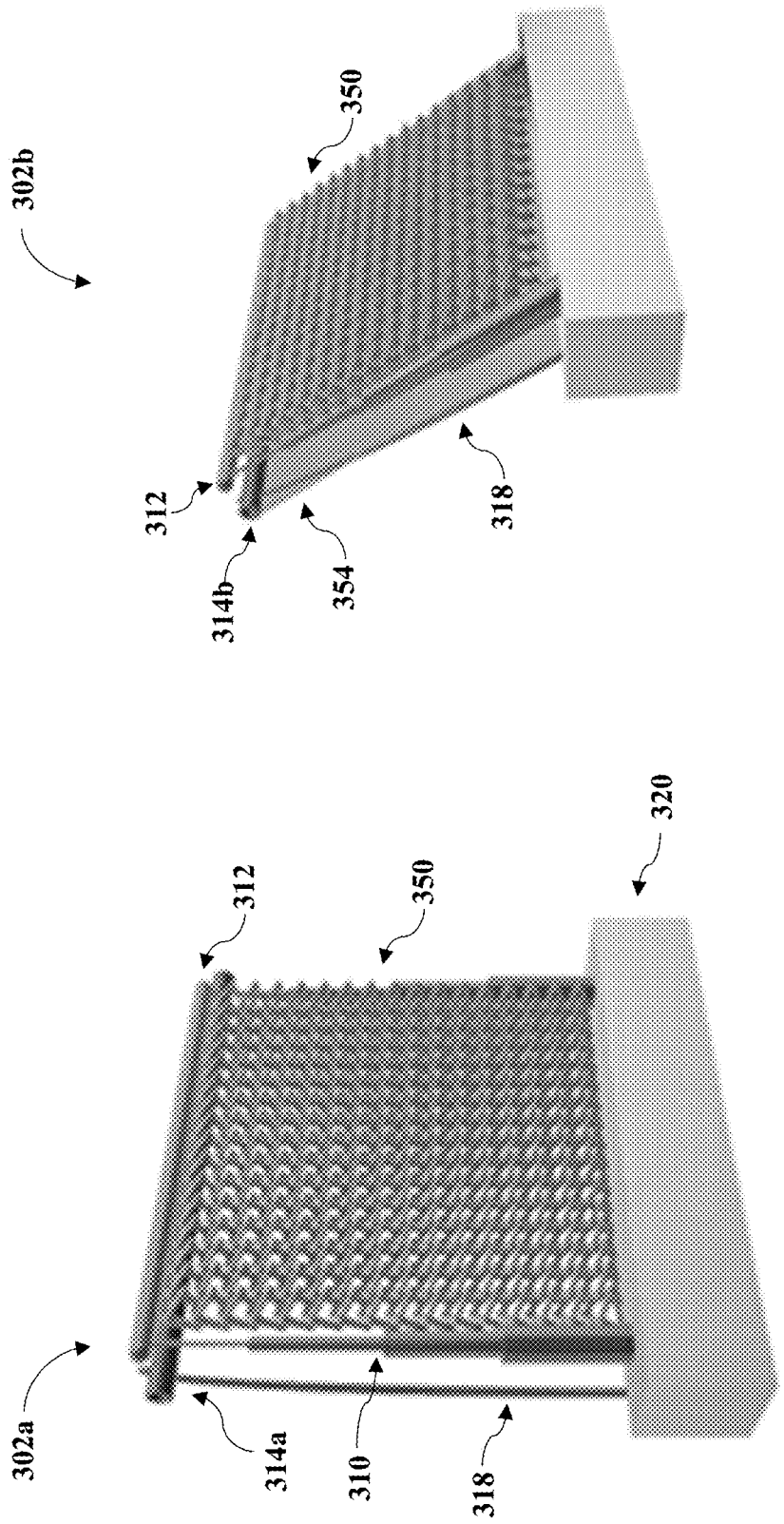
FIG. 3 illustrates a water recovery system in accordance with embodiments of the present disclosure.

FIG. 3 illustrates a water recovery system 300 in accordance with embodiments of the present disclosure. The system 300 may be adjusted to various positions. The water reclamation system 300 is shown in a first position 302a and a second position 302b. The first position 302a is an upright position which may also be referred to as the standard position. The second position 302b is a tilted position and may also be referred to as a rain catch position. The water recovery system 300 may be used to capture water in an upright position or a tilted position.

The first position 302a and second position 302b shown are examples of positions in which the water recovery system 300 may be used. One skilled in the art will recognize that numerous other positions may be used, as befits the circumstances of the geography and ambient conditions, in accordance with the present disclosure.

In some embodiments of the present disclosure, a system for collecting water includes a base and a first arm connected to the base. The first arm may have a first base portion connected to the base and a first extension portion opposite the first base portion. The system may further include a grid extended between the base and the first extension portion. The grid may include a set of hydrophilic fibers extending substantially parallel to the base and a set of hydrophobic fibers intersecting with the hydrophilic fibers.

The system 300 includes a telescopic pole 310 which may be referred to as an arm or a telescopic arm. The pole 310 is connected to a base 320 via mounting brackets (not shown) within the base 320 and extended on actuators (not shown). The system 300 also includes a guide wire 318 which may guide a tarp 354. The tarp 354 may be housed in a tarp roll 314a while not deployed and may deploy from the tarp roll 314b. The guide wire 318 may guide the tarp 354 while it is in motion and may provide stability for the tarp 354 while it is in use.

The system 300 may include a smart component such as a sensor and/or a solar array 312. A sensor 312 may detect, for example, a change in the weather which may call for a change in how the water recovery system 300 is used or whether to store or deploy the system 300.

In some embodiments of the present disclosure, the system may include a second arm such that the first arm, the second arm, and the base are arranged so as to hold the grid unfurled. In some embodiments, the second arm extends substantially parallel to the base and the grid extends between the base and the second arm. In some embodiments, a third arm extends substantially parallel to the first arm; the third arm may have a base portion connected to the base and an extension portion opposite the base portion, and the second arm may connect to the first arm at the first extension portion and the third arm at the extension portion.

The system 300 includes a water recovery net 350. The water recovery net 350 may also be referred to as a water reclamation net 350 or a fog net 350. The telescopic pole 310 is shown extended such that the water recovery net 350 is held unfurled. The net 350 may be furled, rolled, folded, or otherwise compacted to enable efficient storage and/or transportation. The net 350 may be deployed substantially taut or substantially loose as will maximize water collection under various conditions such as geographic and weather situations.

A fog net 350 may be unfurled so as to maximize or substantially maximize the surface area of the weave on the net 350 such that the maximization or substantial maximization of the surface area of the surface area of the grid 350 may maximize or substantially maximize the collection of water into the reservoir.

Figure 4:
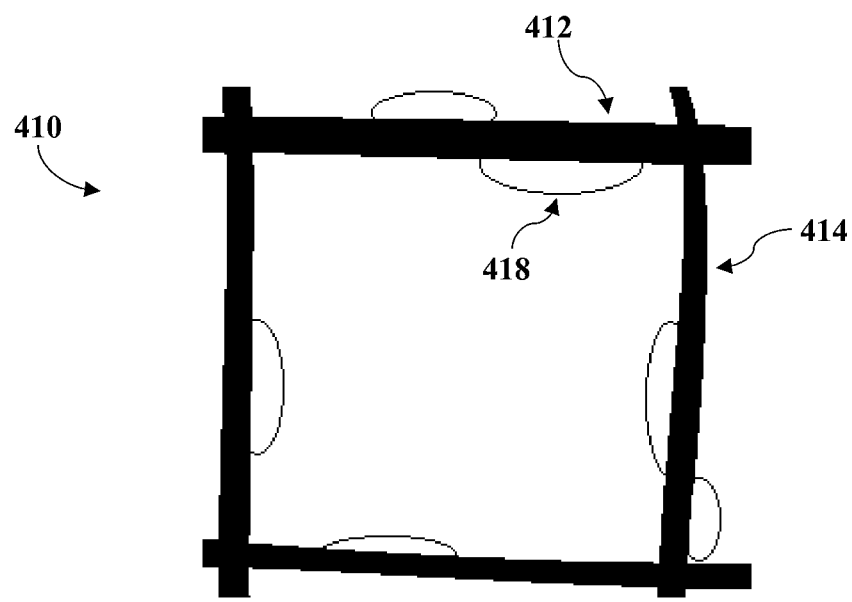
FIG. 4 depicts a diagram of weave patterns of a water recovery system in accordance with embodiments of the present disclosure.
Figure 4:
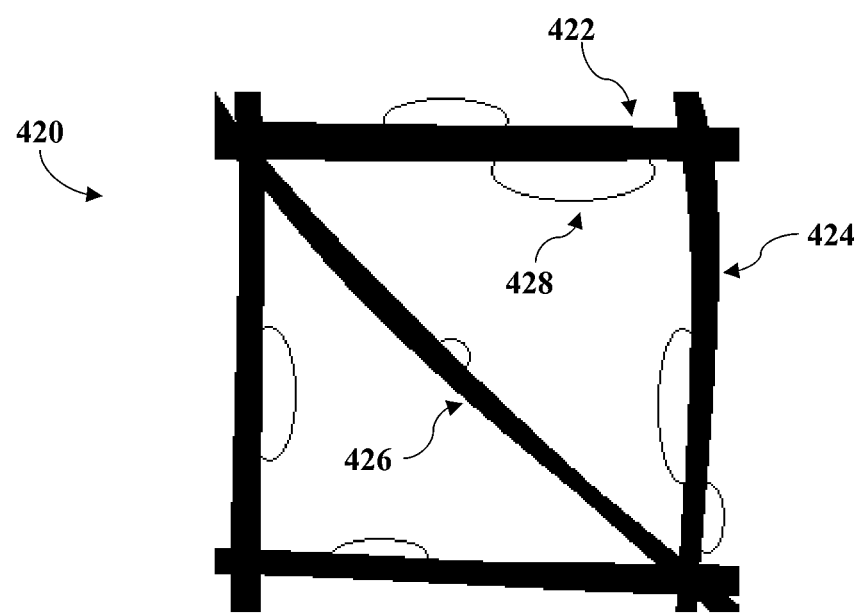

FIG. 4 depicts a diagram of weave patterns 400 of a water recovery system in accordance with embodiments of the present disclosure. Box weave 410 and a cross weave 420 patterns are shown. The box weave 410 uses a simple box pattern with fibers intersecting substantially perpendicularly. The cross weave 420 uses a box base and connects one distant corner to another. Other weaves will be evident to those skilled in the art such as, for example, a dual-cross weave (which may also be referred to as an X-weave because it connects both pairs of distant corners to form an X in the box). Multiple weave patterns may be used in the same net. For example, a fog net may use a box pattern near the top of the net and a dual-cross weave near the bottom of the net to hasten collected water to the reservoir before it evaporates.

The box weave 410 has a first fiber 412 intersecting with a second fiber 414. The first fiber 412 may be referred to as a weft fiber because it is substantially parallel to the base. The second fiber 414 may be referred to as a warp fiber because it intersects with the first fiber 412. The second fiber 414 may also be substantially perpendicular to the first fiber 412 and substantially perpendicular to the base.

The first fiber 412 is treated with a hydrophilic coating and the second fiber 414 is treated with a hydrophobic coating. Water droplets 418 rapidly travel down the hydrophobic second fibers 414 to the hydrophilic first fibers 412. The hydrophilic coating of the first fibers 412 may increase the collection rate of the water droplets 418, and the hydrophobic coating of the second fibers 414 may increase the speed at which the water droplets 418 travel from the fog net to the reservoir. Speeding the travel of the water droplets 418 to the reservoir may enable better capture of water by preventing the water droplets 418 from evaporating into the atmosphere.

The cross weave 420 also uses first fibers 422 which may be referred to as weft fibers because they are substantially parallel to the base as well as second fibers 424 which may also be referred to as warp fibers because they intersect with the first fibers 422. The second fibers 424 may also be substantially perpendicular to the first fibers 422 and substantially perpendicular to the base. The first fibers 422 are hydrophilic to enhance collection and the second fibers 424 are hydrophobic to speed the water droplets 428 to the reservoir.

The cross weave 420 additionally uses a third fiber 426 to connect between the corners of the box. The third fiber 426 may extend through portions of the net (e.g., only the bottom portion of the net has a cross weave 420, or a third fiber 426 may extend from the top-right corner of a net to the bottom left corner of the net) or the entirety of the net. The third fiber 426 may be hydrophilic to increase water capture or hydrophobic to increase the speed at which water reaches the reservoir. Third fibers 426 may be a combination of hydrophilic and hydrophobic. For example, a top portion of a third fiber 426 may be hydrophobic whereas a bottom portion of the third fiber 426 may be hydrophilic.

In cases of a dual-cross weave, the third fiber 426 and the fourth fiber (which may be substantially perpendicular to the third fiber 426) may both be entirely or in part hydrophilic, hydrophobic, or some combination thereof. For example, a third fiber 426 may be hydrophilic and a fourth fiber may be hydrophobic. In another embodiment, a top section of each of the third fiber 426 and the fourth fiber may be hydrophobic whereas a bottom section of each of the third fiber 426 and the fourth fiber may be hydrophilic. Hydrophilic and hydrophobic components may be combined in other ways as well; for example, outer segments of the fog net could use hydrophilic cross-fibers whereas inner segments of the fog net could use hydrophobic cross-fibers.

The hydrophilic fibers may be constructed of hydrophilic material. Hydrophilic fibers may be constructed of hydrophilic material and coated with a hydrophilic coating. The hydrophilic fibers may be constructed of non-hydrophilic (e.g., hydrophobic or water neutral) fibers and coated with a hydrophilic coating. Fibers may be coated partially, substantially, or entirely with coating.

Similarly, the hydrophobic fibers may be constructed of hydrophobic material. Hydrophobic fibers may be constructed of hydrophobic material and coated with a hydrophobic coating. The hydrophobic fibers may be constructed of non-hydrophobic (e.g., hydrophilic or water neutral) fibers and coated with a hydrophobic coating. Fibers may be coated partially, substantially, or entirely with coating.

In some embodiments of the present disclosure, parts or all of the system may include a filtration mechanism and/or process. For example, in some embodiments of the present disclosure, each weave 410 and 420 may include limestone and/or silver to sanitize water for potable use. In other embodiments, a filtration process may be included in the base, or installed at the collection portion of the base such that collected water is filtered before entering the reservoir.

In some embodiments of the present disclosure, the first arm and the grid have at least one range of motion while in an open position. In some embodiments, the system has one or more sensors to monitor ambient conditions which may trigger, if certain conditions are met, an automatic adjustment of a position of the grid within at least one range of motion to maximize water collection.

Figure 5:
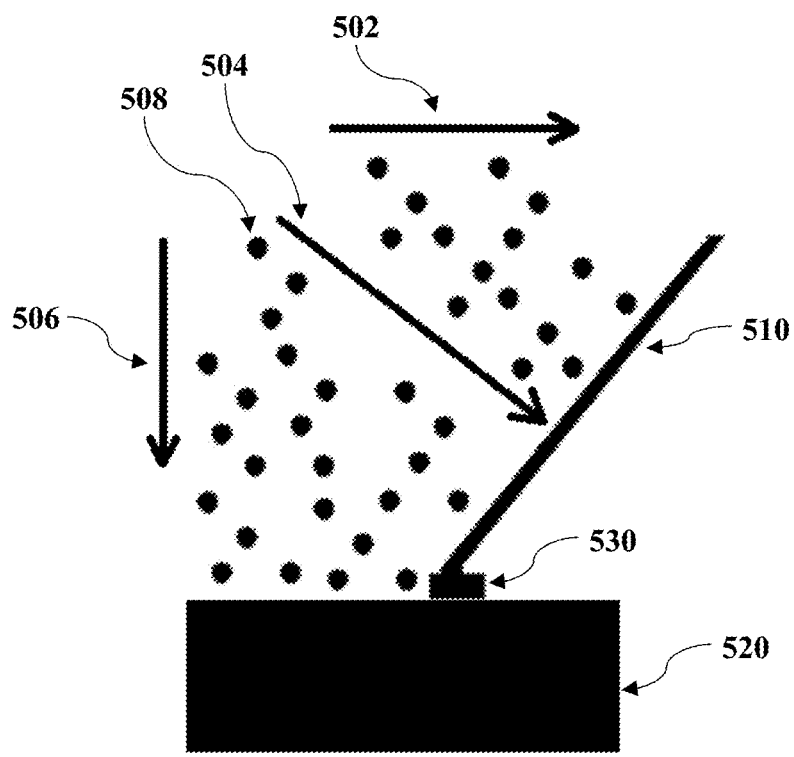
FIG. 5 illustrates a diagram of water recovery according to embodiments of the present disclosure.

FIG. 5 illustrates a diagram of water recovery 500 according to embodiments of the present disclosure. The water recovery diagram 500 shows a water collector 510 connected to a base 520 via mounting brackets 530. In this diagram 500, the water recovery net and the water recovery tarp are shown together as the water collector 510. The diagram 500 shows water droplets 508 condensing. Precipitation 508 (e.g., rain) may fall at different rates and different angles, and the water recovery net 510 may be positioned to maximize water collection.

The angle of the water collector 510 may be changed to maximize capture of precipitation based on wind conditions. Specifically, an optimum angle may be determined using wind velocity, or the speed and direction of the wind. The precipitation velocity $v_t$ 504 is shown as the angled arrow. The precipitation velocity $v_t$ 504 has a horizontal velocity component $v_h$ which travels in a horizontal direction 502 and a vertical velocity component $v_v$ which travels in a vertical direction 506. The optimal angle for maximizing water collection during a precipitation event may be the water collector 510 adjusted to be at a right (90°) angle to the direction 504 of the precipitation velocity $v_t$.

In circumstances of no to low wind, the rate at which water droplets 508 arrive on the water collector 510 can be calculated as:

$$R = N \times v_v$$

wherein N is the density of the rain of the rain drops 508, v is the vertical velocity, and R is the rate of arrival of water droplets on the water collector. In circumstances of no to low wind, the angle of the water recovery net 510 may default to 75° to maximize rain collection.

In circumstances of moderate wind, horizontal forces may be taken into effect. This may be achieved by computing the precipitation velocity $v_t$ as:

$$v_t = \sqrt{v_v^2 + v_h^2}$$

wherein $v_t$ is the precipitation velocity, $v_h$ is the horizontal velocity component of the precipitation velocity $v_t$, and $v_v$ is the vertical velocity component of the precipitation velocity $v_t$. The angle of approach θ of the rain may be calculated as:

$$v_t = \frac{v_v}{\cos(\theta)}$$

which can be rearranged as:

$$\theta = \cos^{-1}\left(\frac{v_v}{v_t}\right)$$

wherein θ is the angle between the direction 506 of vertical velocity $v_v$ and the direction 504 of rain velocity $v_t$. The direction 504 of rain velocity $v_t$ can thus be calculated, and the angle of the water collector 510 may be adjusted to optimize water collection rate. The optimization of the water collection rate may occur when the water collector 510 is perpendicular or substantially perpendicular to the direction 504 of rain velocity $v_t$.

Figure 6:
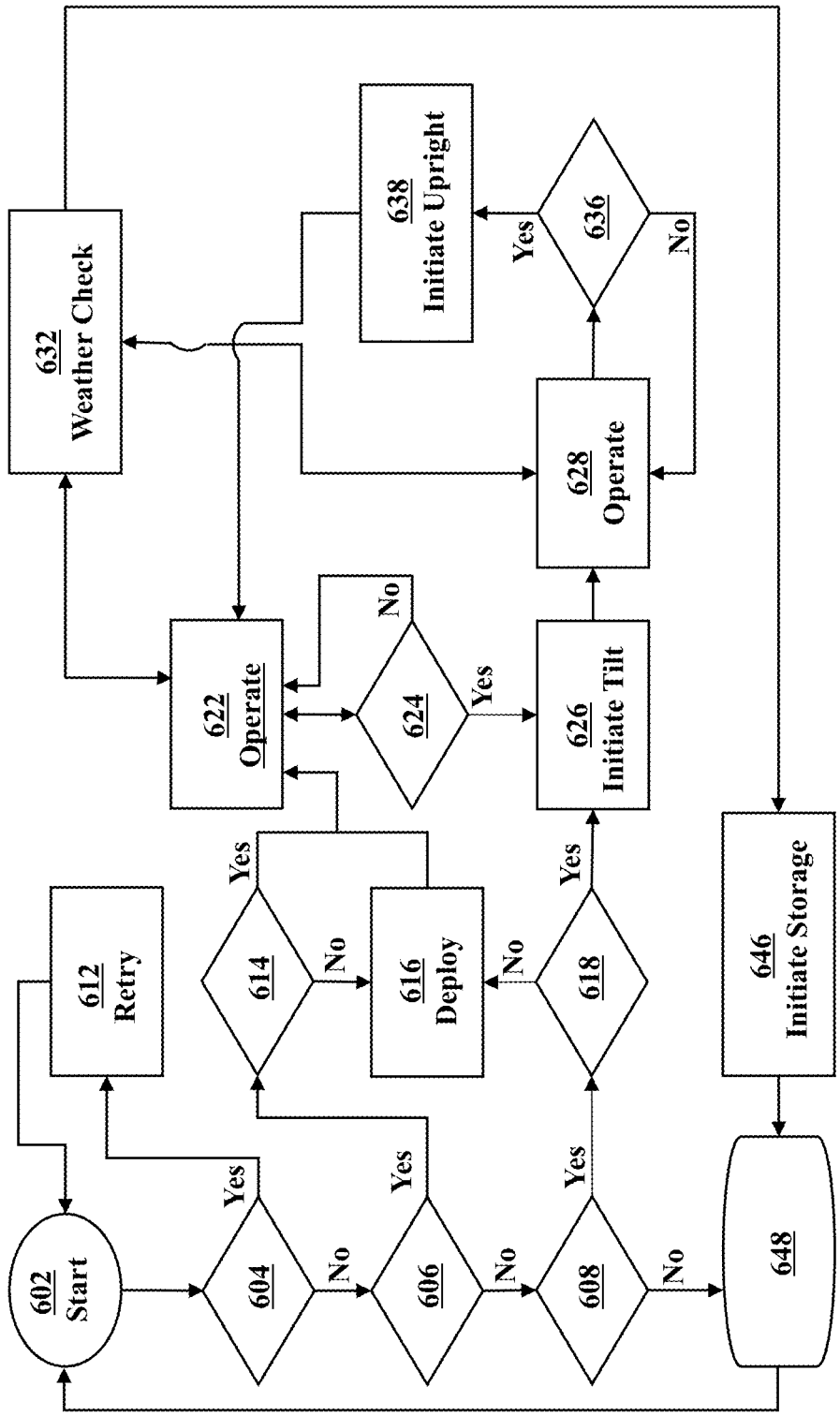
FIG. 6 depicts a flowchart of a water recovery system according to embodiments of the present disclosure.

Maximization of water collection may be included in a method of water recovery. FIG. 6 depicts a flowchart of water recovery 600 according to embodiments of the present disclosure. The flowchart 600 may be initiated at a start position 602. A weather conditions check 604 may check the conditions to see if the conditions threaten the system if it is deployed. The weather conditions check 604 may include collecting data about the temperature, the wind, and other conditions to determine whether the weather may excessively deteriorate (e.g., break) a water recovery system. Storing the fog net may be used to minimize its depreciation. If the weather conditions would threaten the system if it is deployed, the system may remain in a closed (e.g., stored) position and a retry time is calculated 612. The retry time may be calculated 612 based on weather application programming interface (API) data to determine when forecast conditions are expected to improve, and the estimated time until improved conditions may be used to determine when the process will be reattempted.

If the weather conditions are determined to not likely threaten the system if it is deployed, a temperature and humidity check 606 is conducted to determine if the conditions are likely to permit collecting water from the air. This calculation may be based on the relative humidity, temperature, and dew point. If the conditions are within threshold values wherein fog or similar humidity in the air may be collected, the method 600 may proceed to determine 614 whether the fog net has already been deployed and, if not, to deploy 616 the fog net.

The deployed 616 fog net may be normally operated 622 such that the fog net is maintained in a substantially upright condition. A fog net in operation 622 may conduct weather checks 632 to determine if the conditions currently do, or in the proximate future will, threaten the system. If the weather check 632 identifies a threat to the system, the method 600 may continue by initiating storage 646 to return it to a stored or closed state 648 to protect the system from the impending conditions. Similar to the retry operation 612, a time may be calculated based on data from a weather application programming interface (API) to determine when forecast conditions are expected to improve, and the estimated time until improved conditions may be used to determine when the process will be reattempted. Alternatively, the method 600 may employ another approach such as, for example, the method 600 may wait for a manual prompting to proceed to the start operation 602.

If the fog net is deployed 616 fog net and operating normally 622, precipitation may be monitored 624. If there is no precipitation and/or if precipitation is unlikely, the fog net may maintain standard operation 622. If there is precipitation and/or if precipitation is likely, the fog net may be tilted 626 to operate in a precipitation catching position 628. The method 600 may employ a weather check 632 to determine whether the conditions remain safe for operation of the fog net and, if not, storage of the fog net may be initiated 646. As conditions remain safe for operation 628 of the fog net in the tilted position, the method 636 may employ a precipitation check 636 to determine if the precipitation has stopped. If the precipitation has stopped, the fog net may be changed into an upright position 638 to operate normally 622; otherwise, the fog net may remain in the precipitation configuration to continue operating 628.

The method 600 may use another pathway to achieve operation 628 in precipitation conditions. If the weather conditions are determined to not likely threaten the system if it is deployed, and if the conditions are such that fog and/or other ambient humidity are not likely to be collected, the method proceeds to check 608 for precipitation. If the check 608 is negative such that there is no precipitation and/or precipitation is unlikely, the fog net may remain in a closed or stored state 648 such that the system is ready to re-commence the method from the beginning. If the precipitation check 608 is positive such that there is precipitation and/or precipitation is likely, the method 600 may continue to determine 618 whether the fog net has already been deployed and, if not, to deploy 616 the fog net. If the determination 618 is that the fog net has been deployed, the fog net may be tilted 626 to operate 628 in a manner suitable to capture precipitation.

Various thresholds may be used to optimize the circumstances based on the climate, conditions, risk tolerance, construction materials, and other variables. Thresholds may be used to identify whether to deploy 616, operate normally 622, or store 646 the fog net. Certain thresholds may initiate specific operations in the method 600 (e.g., deploy or store the fog net) whereas others may trigger additional monitoring and/or notifications submitted to a user. The following threshold values may be used in some embodiments to trigger certain actions in the method 600:

| Threshold | Normal Operations | Warning Alert | High Alert |
|---|---|---|---|
| Wind | 0-35 mph | 36-50 mph | ≥50 mph |
| Action | Normal operation | Check status with an increased frequency | Store procedure initiated |
| Temperature | 32° F.-95° F. | 95° F.-105° F. | ≥105° F. |
| Action | Normal operation | Alert regarding high temperature | Store procedure initiated |
| Humidity | ≥5% | 1-5% | ≤1% |
| Action | Normal operation | Alert regarding low humidity | Store procedure initiated |

Metrics such as environmental conditions (e.g., wind velocity, temperature, and humidity) as well as variables relating to the relevant equipment (e.g., size, weight, and materials) may be analyzed to determine the most appropriate course of action for a specific system in a certain region with particular environmental expectations. Thresholds may change, for example, based on the season to account for the likelihood of rain during the dry season versus during the monsoon season. In another example, the threshold for storage based on wind speed may differ between a system made primarily out of balsa wood versus a unit made primarily out of stainless steel to account for the weight and sturdiness differences between the units.

In some embodiments of the present disclosure, the fog net may be deployed and stored automatically based on set thresholds. In some embodiments, the fog net may be deployed and stored manually. In some embodiments, a quasi-automatic approach may be taken such that the fog net may, for example, manually deployed and then monitored for automatic triggers.

The illustrated embodiment is an example of a method of water recovery in accordance with the present disclosure. One skilled in the art will recognize the various operations may be conducted in many ways and orders in accordance with the present disclosure. Further, automated procedures may be bypassed by a user manually inputting instructions or directions into the system, including automated calculations for maximizing water collection, weather checks, time calculations, deployment, and storage decisions, among others. Operations in the method 600 may be moved or removed without deviating from the present disclosure.

Figure 7:
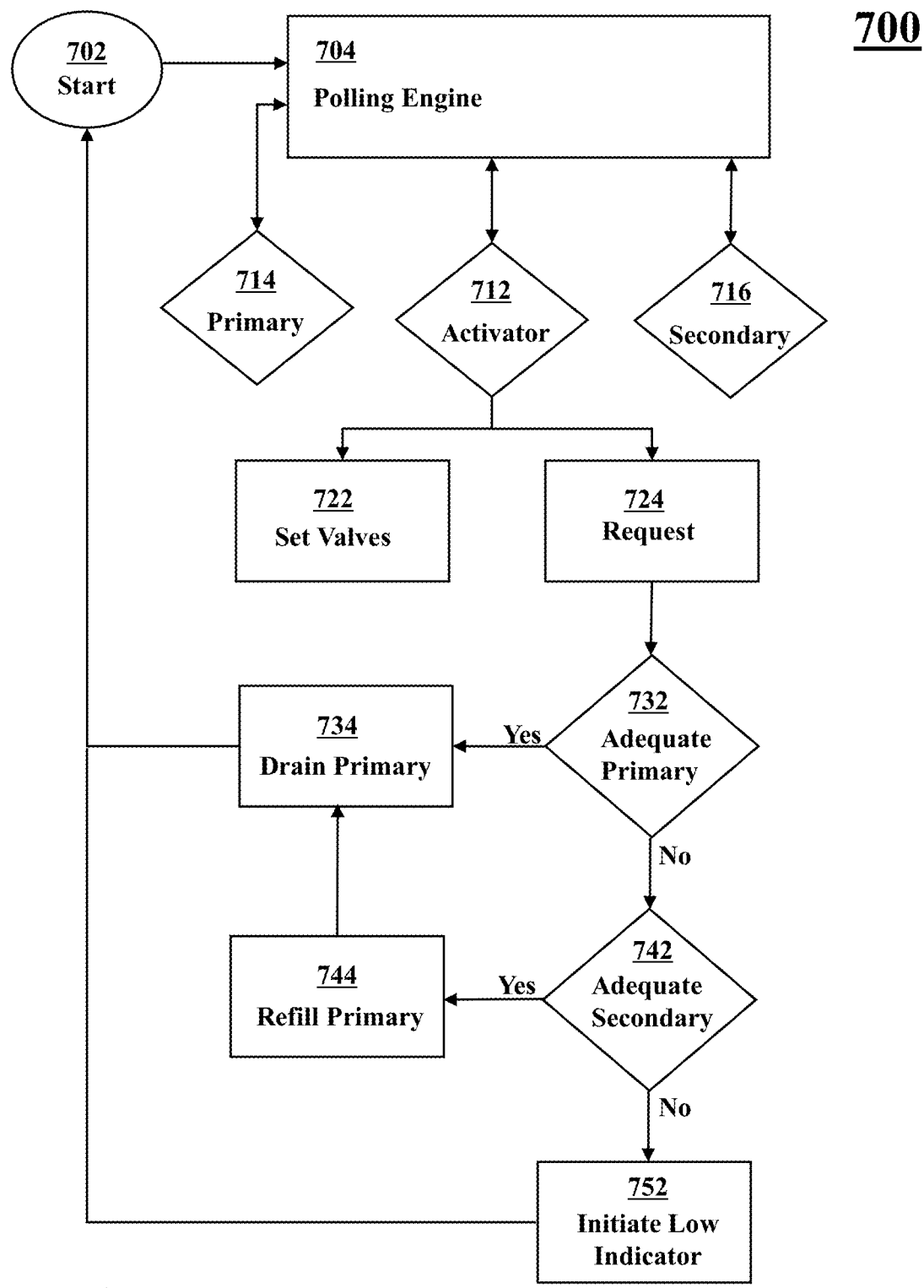
FIG. 7 illustrates a flowchart of the use of a water recovery system in accordance with embodiments of the present disclosure.

FIG. 7 illustrates a flowchart of the use of a water recovery system 700 in accordance with embodiments of the present disclosure. A water requisition request may be started 702 by prompting a polling engine 704 to poll various functions. The polling engine 704 may be in communication with an activator 712, a primary reservoir 714, and a secondary reservoir 716.

The polling engine 704 may prompt the activator 712 that a request has been made. The activator 712 may set the valves 722 as open or closed as indicated by the water sensor. The activator may change the configuration of the valves (e.g., close an open valve or open a closed valve) to the desired valve setting 722.

The activator 714 may request for water 724. The request for water 724 may be followed by an inquiry as to whether there is adequate water 732 in the primary reservoir 714. If there is an adequate supply of water 732 in the primary reservoir 714, the primary reservoir 714 may be drained 734 for the requested amount of water.

If there is not an adequate amount of water 732 in the primary reservoir 714, then an inquiry as to whether there is adequate water in the secondary reservoir 742 may follow.

If there is an adequate supply of water in the secondary reservoir 716, or if the supply of water in the secondary reservoir 716 in addition to the supply of water in the primary reservoir 714 is adequate to meet the request, the secondary reservoir 716 may be emptied into the primary reservoir 714 to refill 744 the primary reservoir 714 and the primary reservoir 714 may be drained 734 to meet the request.

If there is not an adequate supply of water 732, 742 in both the primary and the secondary reservoirs 714 and 716, a low water level indicator may be initiated 752 and the system may be reset to the start 702.

In some embodiments of the present disclosure, the secondary reservoir 716 may be drained directly to comply with a request for water. In some embodiments, both the primary 714 and secondary 716 reservoirs may be drained directly.

In some embodiments of the present disclosure, the method of use of water collected by a water collection system 700 may be fully automated, fully manual, or some combination thereof.

In some embodiments, the polling engine 704 may communicate with an external sensor. For example, a crop sensor may identify that one or more crops can or should be watered. The crop sensor may submit a request for water to the polling engine 704; in some embodiments, the water drained from either the primary 714 or secondary 716 reservoirs may be directed to the crops identified by the crop sensor as would benefit from watering. In some embodiments, the polling engine 704 may communicate with external triggers. For example, a toilet being flushed could trigger a request for water to the refill the toilet bowl or toilet reservoir. In another example, a button may be pressed to request water fill a bucket. In some embodiments, activating a spigot on a reservoir may engage the polling engine 704 to request water 724.

Various thresholds may be used to trigger certain actions or inactions in the use flowchart 700. Thresholds may be used to identify whether to set the valves 722, request water 724, or drain a reservoir 734. Certain thresholds may initiate specific operations (e.g., drain the primary reservoir 734) whereas others may trigger additional monitoring and/or notifications submitted to a user. The following threshold values may be used in some embodiments to trigger certain actions in the method 700:

| Reservoir | Normal Operation | Warning Alert | High Alert | Critical Alert |
| --- | --- | --- | --- | --- |
| Primary Action | ≤65% capacity Normal operation; indicate water level percentage | 66-75% Alert: reservoir is at an adequate level to drain | 75-95% Check secondary, drain primary into secondary if space permits; alert user | >95% Check secondary, drain primary into secondary if space permits; alert user of critical fullness |
| Secondary Action | ≤65% capacity Normal operation; indicate water level percentage | 66-75% Normal operation; indicate water level percentage | 75-94% Normal operation; indicate water level percentage | >95% Alert user that reservoir is at capacity |
| Indicator | Green | Yellow | Orange | Red |

Additionally, a request action result may be determined by a trigger threshold. For example, a request 724 for water from a primary reservoir 714 may be processed and responded to with the water requested if the primary reservoir 714 is at 96% capacity if the critical capacity of the primary reservoir 714 is 90% capacity. In another example, a request 724 for water may check the primary 714 and secondary 716 reservoirs to find the primary reservoir 714 at 3% and the secondary reservoir 716 at 0%; in such case, a response to the request 724 may be a notification of denial of the request due to inadequate water or, alternatively, could notify the user of inadequate water and ask if the user will accept the available water. In some embodiments, a user may submit an inquiry as to the current level of the water in the reservoir; the response may be a notification as to the capacity of the water level (e.g., that the primary reservoir is at 68% capacity) as well as any affiliated alerts (e.g., ready for draining).

Figure 8:
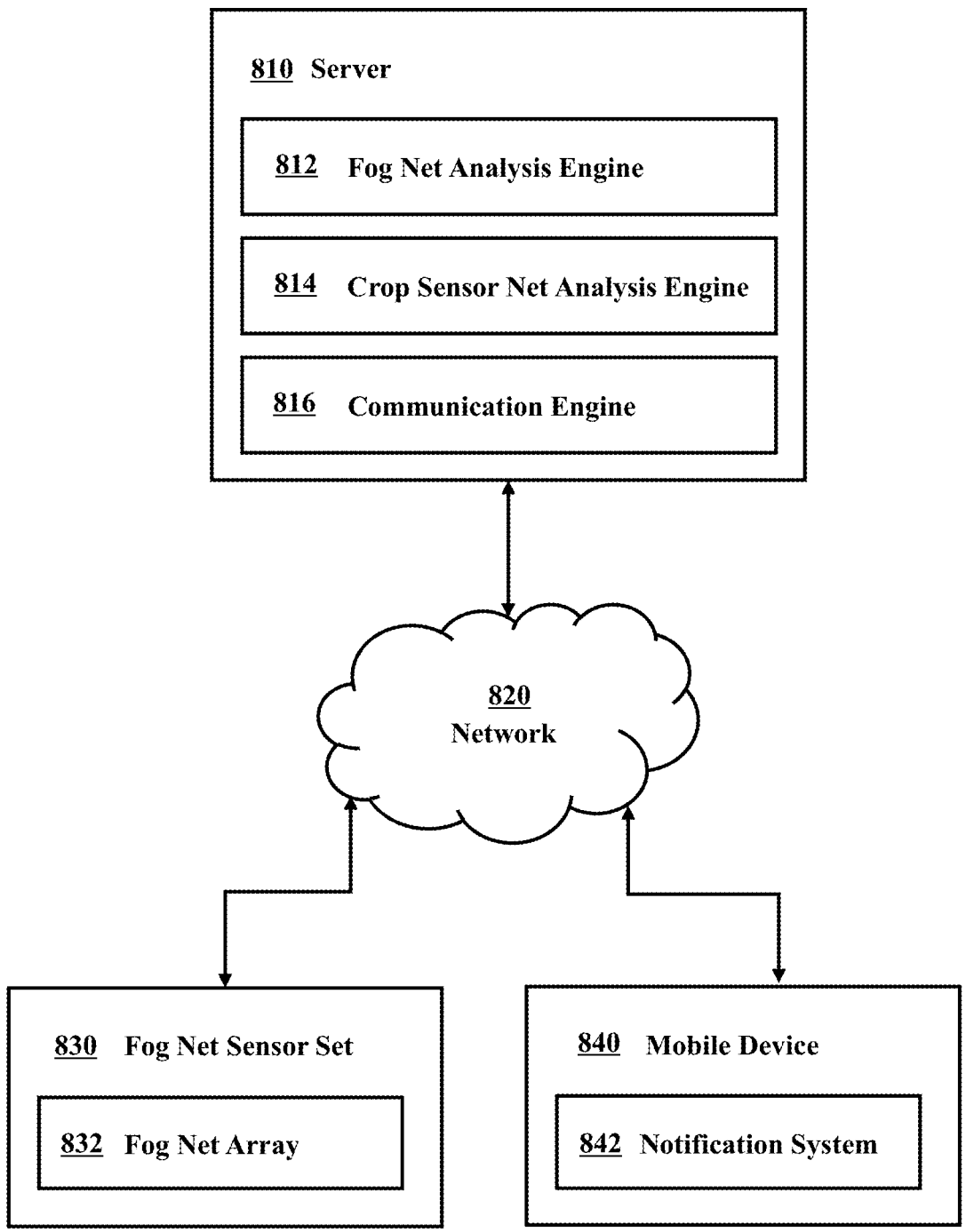
FIG. 8 depicts a diagram of an example computing environment in accordance with embodiments of the present disclosure.

Collection of, and requests for, water may be done in person or remotely. FIG. 8 depicts a diagram of an example computing environment 800 in accordance with embodiments of the present disclosure. A fog net sensor set 830 may include one or more fog net arrays 832. The fog net arrays 832 may include weather sensors. For example, humidity, precipitation, temperature, and dewpoint sensors may be included in a fog net array 832. Weather sensors may collect data to determine whether and which automated functions to perform. Information may be pulled and verified via weather API. Information pulled from sensors and identified via weather API may be used to monitor expected or incoming weather. The fog sensor net 830 may then use the network 820 to communicate with the fog net server 810.

The server 810 may contain or communicate with a fog net analysis engine 812, a crop sensor net analysis engine 814, and/or a communication engine 816. The server 810 thus may facilitate communications between the fog net sensor set 830 and, for example, the fog net analysis engine 812 and/or the crop sensor net analysis engine 814. The communication engine 816 may communicate over the network 820 to the fog net sensor set 830 to, for example, alter the position of the fog net array 832. The communication engine 816 may, for example, initiate deployment, storage, tilting, or making upright of a fog net array 832. The communication engine 816 may also monitor and communicate one or more statuses of the fog net array 832 such as, for example, change in position, power level, reservoir fullness, and whether the fog net array 832 is in communication with one or more other devices.

Other devices a fog net array 832 may be in contact with may include, for example, mobile device 840. A mobile device 840 may be, for example, a remote computer or a cellular phone. The fog net server 810 may communicate with a mobile device 840 over a network 820. The communication engine 816 may submit alerts to the mobile device 840 via an operating system push notification system 842 on the mobile device 840. The communication engine 816 may communicate via other methods as well such as, for example, automated email, text message, instant message, or other communicative dispatch. The communication engine 816 may submit to the mobile device 840 may include, for example, a change in the positioning of a fog net 832, fog net 832 power level, the initiation of storage of the fog net 832, or the initiation of deployment of the fog net 832.

The mobile device 840 may be used to request and/or override functions of the fog net sensor set 830. For example, a mobile device 840 may be used to override the fog net array 832 from changing to an upright position from a rain catching position. In another example, a mobile device 840 may be used to request the fog net array 832 be transitioned into a storage or closed position. Notifications of requests and overrides from the mobile device may be accepted and processed by the communication engine 816. The communication engine 816 may communicate the request/override to the fog net array 832. In such and similar ways, the fog net array 832 may be used remotely via cloud computing.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment currently known or that which may be later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but the consumer has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software which may include operating systems and applications. The consumer does not manage or control the underlying cloud infrastructure but has control over operating systems, storage, and deployed applications, and the consumer possibly has limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and/or compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
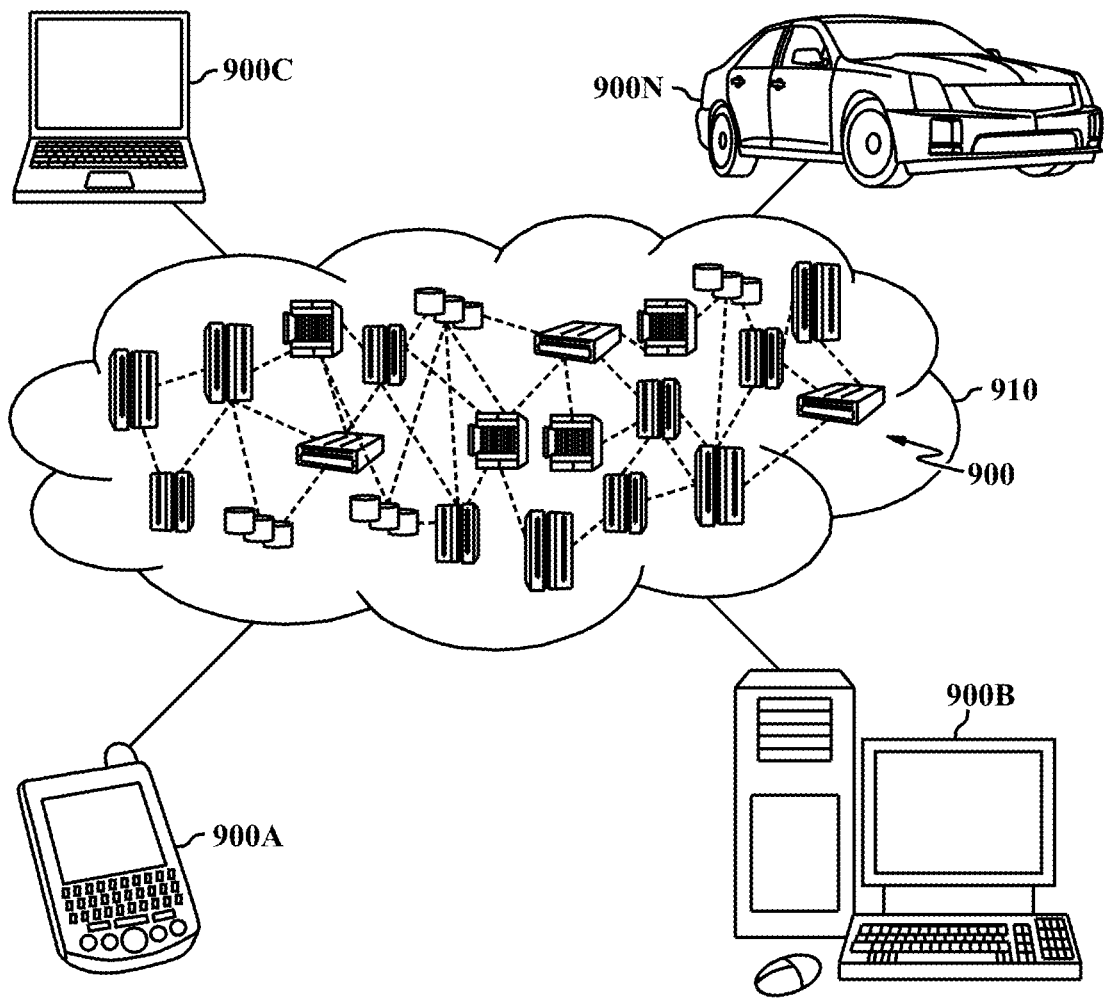
FIG. 9 illustrates a cloud computing environment according to embodiments of the present disclosure.

FIG. 9 illustrates a cloud computing environment 910 in accordance with embodiments of the present disclosure. As shown, cloud computing environment 910 includes one or more cloud computing nodes 900 with which local computing devices used by cloud consumers such as, for example, personal digital assistant (PDA) or cellular telephone 900A, desktop computer 900B, laptop computer 900C, and/or automobile computer system 900N may communicate. Nodes 900 may communicate with one another. They may be grouped (not shown) physically or virtually, in one or more networks, such as private, community, public, or hybrid clouds as described hereinabove, or a combination thereof.

This allows cloud computing environment 910 to offer infrastructure, platforms, and/or software as services for which a cloud consumer does not need to maintain resources on a local computing device. It is understood that the types of computing devices 900A-N shown in FIG. 9 are intended to be illustrative only and that computing nodes 900 and cloud computing environment 910 can communicate with any type of computerized device over any type of network and/or network addressable connection (e.g., using a web browser).

Figure 10:
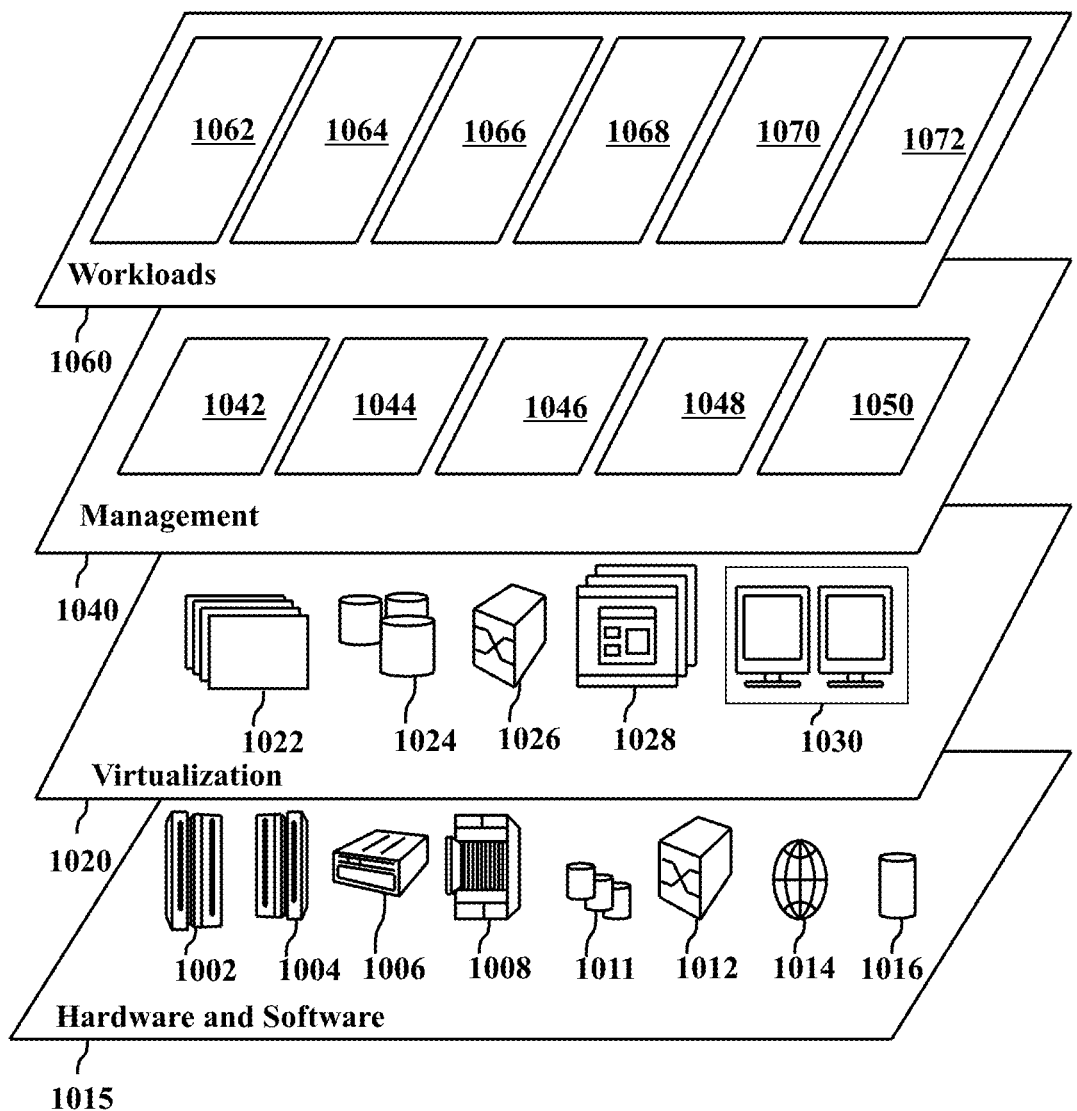
FIG. 10 illustrates abstraction model layers in accordance with embodiments of the present disclosure.

FIG. 10 illustrates abstraction model layers 1000 provided by cloud computing environment 910 (FIG. 9) in accordance with embodiments of the present disclosure. It should be understood in advance that the components, layers, and functions shown in FIG. 10 are intended to be illustrative only and embodiments of the disclosure are not limited thereto. As depicted below, the following layers and corresponding functions are provided.

Hardware and software layer 1015 includes hardware and software components. Examples of hardware components include: mainframes 1002; RISC (Reduced Instruction Set Computer) architecture-based servers 1004; servers 1006; blade servers 1008; storage devices 1011; and networks and networking components 1012. In some embodiments, software components include network application server software 1014 and database software 1016.

Virtualization layer 1020 provides an abstraction layer from which the following examples of virtual entities may be provided: virtual servers 1022; virtual storage 1024; virtual networks 1026, including virtual private networks; virtual applications and operating systems 1028; and virtual clients 1030.

In one example, management layer 1040 may provide the functions described below. Resource provisioning 1042 provides dynamic procurement of computing resources and other resources that are utilized to perform tasks within the cloud computing environment. Metering and pricing 1044 provide cost tracking as resources and are utilized within the cloud computing environment as well as billing or invoicing for consumption of these resources. In one example, these resources may include application software licenses. Security provides identity verification for cloud consumers and tasks as well as protection for data and other resources. User portal 1046 provides access to the cloud computing environment for consumers and system administrators. Service level management 1048 provides cloud computing resource allocation and management such that required service levels are met. Service level agreement (SLA) planning and fulfillment 1050 provide pre-arrangement for, and procurement of, cloud computing resources for which a future requirement is anticipated in accordance with an SLA.

Workloads layer 1060 provides examples of functionality for which the cloud computing environment may be utilized. Examples of workloads and functions which may be provided from this layer include: mapping and navigation 1062; software development and lifecycle management 1064; virtual classroom education delivery 1066; data analytics processing 1068; transaction processing 1070; and a smart fog net 1072.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide, or other transmission media (e.g., light pulses passing through a fiber-optic cable) or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN) or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although the present disclosure has been described in terms of specific embodiments, it is anticipated that alterations and modification thereof will become apparent to the skilled in the art. The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or the technical improvement over technologies found in the marketplace or to enable others of ordinary skill in the art to understand the embodiments disclosed herein. Therefore, it is intended that the following claims be interpreted as covering all such alterations and modifications as fall within the true spirit and scope of the disclosure.

What is claimed is:

1. A system for collecting water, said system comprising:
a base;
a first arm connected to said base wherein said first arm has a first base portion connected to said base and a first extension portion opposite said first base portion;
a second arm that extends substantially parallel to said base; and
a grid that extends between said base and said second arm, wherein said grid comprises:
   a first set of fibers extending substantially parallel to said base wherein said first set of fibers are hydrophilic; and
   a second set of fibers intersecting with said first set fibers wherein said second set of fibers are hydrophobic,
wherein said first arm may extend said grid into a water collection position to collect water.

2. The system of claim 1, wherein:
said base, said first arm, and said second arm are physically arranged so as to hold said grid unfurled.

3. The system of claim 2 further comprising:
a third arm substantially parallel to said first arm, wherein:
   said third arm has a base portion connected to said base;
   said third arm has an extension portion opposite said base portion; and
   said second arm connects said first arm at said first extension portion to said third arm at said extension portion.

4. The system of claim 1 wherein:
said first arm and said grid are substantially contained within said base while in a closed position.

5. The system of claim 1 wherein:
said first arm and said grid have at least one range of motion while in an open position.

6. The system of claim 5 wherein the system further comprises:
one or more sensors to monitor ambient conditions, wherein said one or more sensors trigger an automatic adjustment of a position of said grid within said at least one range of motion to maximize water collection.

7. The system of claim 1 wherein:
said first arm and said grid transition from an open position to a closed position if a storage threshold value is reached; and
said first arm and said grid transition from said closed position to said open position if a deployment threshold value is reached.

8. A method for water collection, said method comprising:
receiving, by a processor, one or more metrics from one or more respective sensors;
analyzing said one or more metrics;
determining whether to deploy a first structure, wherein said first structure comprises a first arm connected to a base, a second arm that extends substantially parallel to said base, and a grid that extends between said base and said second arm, wherein said grid comprises:
   a first set of fibers extending substantially parallel to said base, wherein said first set of fibers are hydrophilic; and
   a second set of fibers extending substantially perpendicular to said base, wherein said second set of fibers are hydrophobic; and
identifying a position of said first structure.

9. The method of claim 8 wherein:
said structure includes a grid extending from a base;
said grid includes a first set of fibers extending substantially parallel to said base wherein said first set of fibers are hydrophilic; and
said grid includes a second set of fibers extending substantially perpendicular to said base wherein said second set of fibers are hydrophobic.

10. The method of claim 8 wherein determining whether to deploy said first structure includes:
identifying, from one or more metrics, that a deployment threshold is not met; and
retaining said first structure in a closed position.

11. The method of claim 8 wherein determining whether to deploy said first structure includes:
identifying, from one or more metrics, that a deployment threshold is met; and
deploying said first structure.

12. The method of claim 11 further comprising:
determining an optimal position of said first structure based on said one or more metrics; and
positioning, automatically, said first structure.

13. The method of claim 12 further comprising:
receiving data from an application, wherein said optimal position is determined based at least in part on said data.

14. The method of claim 8 wherein:
said first structure includes a first arm and a grid, wherein said first arm and said grid have at least one range of motion while in an open position.

15. The method of claim 14 wherein:
said grid in said open position adjusts via said at least one range of motion to minimize depreciation of said system.

16. The method of claim 14 wherein:
said grid in said open position adjusts via said at least one range of motion to maximize water collection.

17. A computer program product for collecting water, said computer program product comprising a computer readable storage medium having program instructions embodied therewith, said program instructions executable by a processor to cause said processor perform a function, said function comprising:

receiving one or more metrics from one or more respective sensors;

analyzing said one or more metrics;

determining whether to deploy a first structure, wherein said first structure comprises a first arm connected to a base, a second arm that extends substantially parallel to said base, and a grid that extends between said base and said second arm, wherein said grid comprises:

a first set of fibers extending substantially parallel to said base, wherein said first set of fibers are hydrophilic; and a second set of fibers extending substantially perpendicular to said base, wherein said second set of fibers are hydrophobic; and identifying a position of said first structure.

18. The computer program product of claim 17 wherein:
said first structure includes a grid extending from a base;
said grid includes a first set of fibers extending substantially parallel to said base wherein said first set of fibers are hydrophilic; and
said grid includes a second set of fibers extending substantially perpendicular to said base wherein said second set of fibers are hydrophobic.

19. The computer program product of claim 17 wherein:
said first structure includes a grid, a first arm, and one or more sensors;
said first arm and said grid transition from an open position to a closed position if a storage threshold value is reached;
said first arm and said grid transition from said closed position to said open position if a deployment threshold value is reached; and
said one or more sensors trigger an automatic adjustment of a position of said grid in said open position to maximize water collection.

* * * * *